(12) United States Patent
Shimakura (10) Patent No.: US 7,225,616 B2
(45) Date of Patent: Jun. 5, 2007

(54) STOPPING APPARATUS AND METHOD FOR OIL PUMP

(75) Inventor: Masaki Shimakura, Yokohama (JP)

(73) Assignee: JATCO Ltd., Fuji-shi (JP)

( * ) Notice: Subject to any disclaimer, the term of this patent is extended or adjusted under 35 U.S.C. 154(b) by 92 days.

(21) Appl. No.: 11/056,162

(22) Filed: Feb. 14, 2005

(65) Prior Publication Data

US 2005/0183415 A1    Aug. 25, 2005

(30) Foreign Application Priority Data

Feb. 20, 2004    (JP) .............................. 2004-044133

(51) Int. Cl.
*F16D 31/02*    (2006.01)
(52) U.S. Cl. ............................ 60/432; 60/441
(58) Field of Classification Search .................. 60/432, 60/436, 437, 438, 441, 442, 455, 459, 460, 60/474, 476
See application file for complete search history.

(56) References Cited

U.S. PATENT DOCUMENTS 2,178,305 A * 10/1939 Smaltz et al. ............... 254/275
5,794,440 A *  8/1998 Lisniansky ................... 60/414
5,845,493 A * 12/1998 Schiffer ........................ 60/327

OTHER PUBLICATIONS

Mechanical Engineering Basic Course 18 Hydraulic Engineering (SI Units Edition), by Asakura Shoten Co., Ltd., Second Edition, Apr. 2003, p. 97.

* cited by examiner

*Primary Examiner*—Igor Kershteyn
(74) *Attorney, Agent, or Firm*—Foley & Lardner LLP

(57) ABSTRACT

In stopping apparatus and method for an oil pump, which are applied to a hydraulic actuator that works based on a hydraulic pressure derived from the oil pump driven by a motor, a backward rotation of the oil pump is prevented by resisting a remaining pressure that is acting on the oil pump from the hydraulic actuator after the hydraulic actuator is deactivated. A one-way clutch disposed on an oil pump drive train between the motor and the oil pump mechanically prevents the backward rotation of the oil pump. Moreover, in order to prevent the backward rotation, a controller of the stopping apparatus gradually decreases the rotation of the motor after the hydraulic actuator is deactivated, and eliminates the remaining pressure within the hydraulic actuator while decreasing the rotation of the motor.

18 Claims, 7 Drawing Sheets

STOPPING APPARATUS AND METHOD FOR OIL PUMP

BACKGROUND OF THE INVENTION:

a) Field of the Invention

The present invention relates to a stopping apparatus and method for an oil pump.

b) Description of the Related Art

A shift control hydraulic circuit for an automatic transmission is included in a hydraulic actuator which works based on a hydraulic pressure derived from the oil pump driven by a motor. The oil pump that is used as a source of the hydraulic pressure for a transmission mechanism of the automatic transmission is suggested to be driven by the motor instead of an engine. In such a case, (a drive of) the motor is deactivated when the shift control hydraulic circuit (or, the hydraulic actuator) is deactivated by turning an ignition switch off. At this time, the hydraulic pressure which remains, in a compressed fashion, within a controlling valve or the transmission mechanism that constitutes the shift control hydraulic circuit (hereinafter, also called a remaining pressure) flows toward the oil pump (i.e., flows in the opposite direction).

Such a backflow of an oil (or, a backflow of the remaining pressure) rotates the oil pump backward since the oil pump can rotate in any direction with the motor deactivated. Thereby, there is a problem that, for example, noise (or, abnormal sound) may be generated. In particular, this tendency (or, problem) is remarkable in a case where the oil pump is a vane pump which is favorably adopted for the automatic transmission.

With this fact taken into consideration, page 97 in a Japanese technical book "Mechanical engineering basic course 18 Hydraulic engineering (SI units edition) the second edition" published in April, 2003 by ASAKURA SHOTEN Co. Ltd. exemplifies a previously proposed stopping apparatus in which a countermeasure against this problem is taken as will be described below.

In a system including a transmission mechanism (namely, an automatic transmission), a controlling valve that performs a shift control for the transmission mechanism, an oil pump that supplies a hydraulic pressure to the controlling valve, and a motor that drives the oil pump, the controlling valve works based on the hydraulic pressure derived from the oil pump driven by the motor and sets a friction element inside the transmission mechanism to be selectively actuated (or, engaged) thereby, a required shift mode of the transmission mechanism is selected.

In such a system, a nonreturn (or, check) valve is interposed on a hydraulic route which establishes a connection between the controlling valve and the oil pump. Thereby, the nonreturn valve prevents an oil from (backward) flowing to the oil pump from the transmission mechanism or the controlling valve due to the remaining pressure within the transmission mechanism or the controlling valve. Hence, the oil pump does not rotate backward. A generation of the noise (or, the abnormal sound) due to such a backward rotation can be avoided.

SUMMARY OF THE INVENTION

However, in the previously proposed stopping apparatus for an oil pump disclosed in the above-described Japanese document, the nonreturn valve prohibits an oil flow toward the oil pump from the transmission mechanism or the controlling valve. Hence, the nonreturn valve needs to be disposed on a hydraulic route between the controlling valve and the oil pump. So, there is an inconvenience that this nonreturn valve causes a hydraulic loss while performing the usual shift control and a space for disposing the nonreturn valve is needed even if it is difficult to allot the space.

It is, therefore, an object of the present invention to provide stopping apparatus and method for an oil pump, which are capable of resolving the problem related to, for example, the abnormal sound of the oil pump without the inconvenience related to the space and hydraulic loss of the nonreturn valve. The stopping apparatus and method for an oil pump according to the present invention is achieved by preventing the oil pump from rotating backward irrespective of the oil's backflow toward the oil pump while allowing the oil to flow backward, or is achieved by preventing the oil from backward flowing to the oil pump with the nonreturn valve not used.

According to one aspect of the present invention, there is provided a stopping apparatus for an oil pump, the stopping apparatus being applied to a hydraulic actuator, the hydraulic actuator working on the basis of a hydraulic pressure derived from the oil pump driven by a motor, the stopping apparatus being capable of controllably deactivating the oil pump when the hydraulic actuator is deactivated, the stopping apparatus comprising an oil pump backward rotation preventing section that prevents a backward rotation of the oil pump, the oil pump backward rotation preventing section resisting a remaining pressure within the hydraulic actuator after the hydraulic actuator is deactivated, the remaining pressure acting on the oil pump.

According to another aspect of the invention, there is provided a stopping method for an oil pump, the stopping method being applied to a hydraulic actuator, the hydraulic actuator working on the basis of a hydraulic pressure derived from the oil pump driven by a motor, the stopping method comprising: decreasing a rotation of the motor gradually toward 0 for a predetermined time from a time point at which the hydraulic actuator is deactivated; and eliminating a remaining pressure within the hydraulic actuator while decreasing the rotation of the motor.

According to further aspect of the invention, there is provided a stopping method for an oil pump, the stopping method being applied to a hydraulic actuator, the hydraulic actuator working on the basis of a hydraulic pressure derived from the oil pump driven by a motor, the stopping method comprising: decreasing a rotation of the motor gradually toward a set rotational speed for a lapse of a first predetermined time from a time point at which the hydraulic actuator is deactivated; eliminating a remaining pressure within the hydraulic actuator while decreasing the rotation of the motor toward the set rotational speed; keeping the rotation of the motor at the set rotational speed for a lapse of a second predetermined time from a time point at which the first predetermined time has just elapsed; and setting the rotation of the motor to 0 when the second predetermined time has just elapsed.

According to further aspect of the invention, there is provided a stopping apparatus for an oil pump, the stopping apparatus comprising an oil pump backward rotation preventing section that prevents a backward rotation of the oil pump, the oil pump backward rotation preventing section resisting a remaining pressure within a hydraulic actuator after the hydraulic actuator is deactivated, the remaining pressure acting on the oil pump.

The disclosure of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
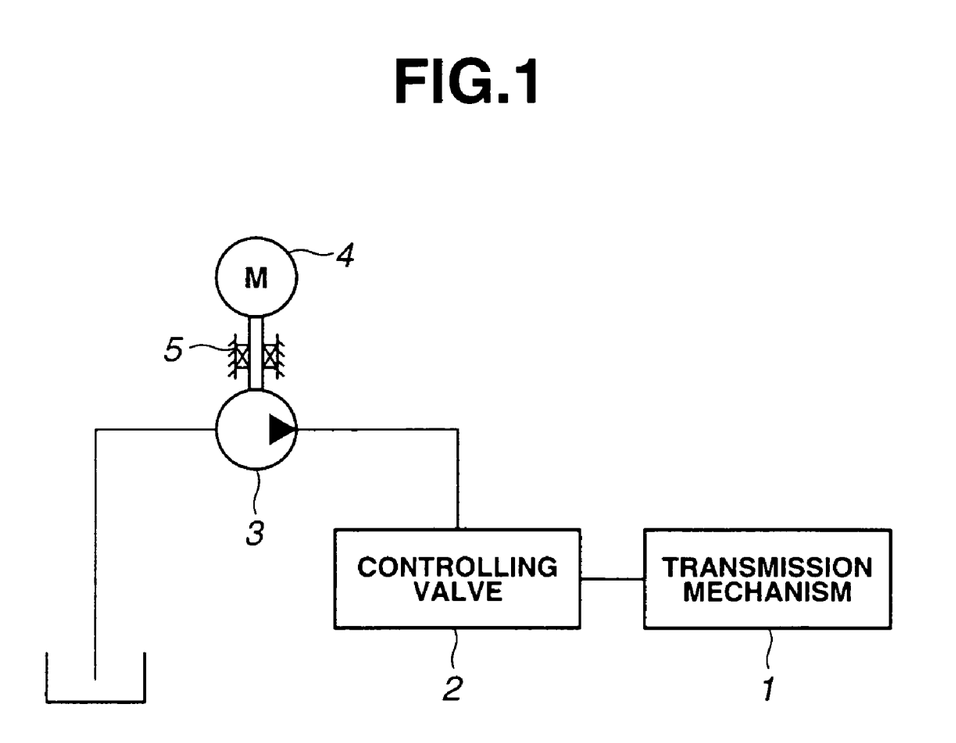
FIG. 1 is a schematic diagram representing a shift control hydraulic circuit for an automatic transmission, to which a stopping apparatus for an oil pump in a first preferred embodiment according to the present invention is applied.
Figure 2:
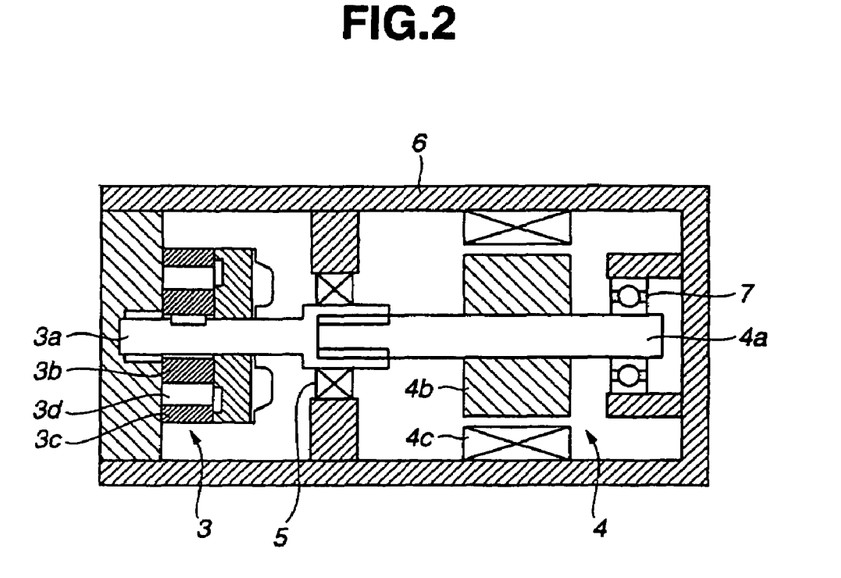
FIG. 2 is a partially enlarged sectional view briefly representing a one-way clutch that is used in the first embodiment and representing surrounding elements.

FIG. 1 is a schematic diagram representing a shift control hydraulic circuit for an automatic transmission, to which the stopping apparatus for an oil pump in a first preferred embodiment according to the present invention is applied. FIG. 2 is a partially enlarged sectional view briefly representing a one-way clutch that is used in the stopping apparatus for an oil pump in the first embodiment and representing surrounding elements.

In FIG. 1, a transmission mechanism 1 of an automatic transmission, a controlling valve 2 for performing a shift control of transmission mechanism 1, an oil pump 3 (for example, a vane pump) for supplying a hydraulic pressure to controlling valve 2, and a motor 4 for driving oil pump 3 are shown. Transmission mechanism 1 and controlling valve 2 constitute a hydraulic actuator according to the present invention. Controlling valve 2 works based on the hydraulic pressure supplied from oil pump 3 driven by motor 4 and sets a (shifting purpose) friction element inside transmission mechanism 1 to be selectively actuated (or, engaged) by means of the hydraulic pressure. Thereby, a required shift mode of transmission mechanism 1 is selected.

In this first embodiment, a one-way clutch 5 is disposed (or, installed) at any position on an oil pump drive train between oil pump 3 and motor 4. One-way clutch 5 is interposed between the oil pump drive train and a fixed portion. Moreover, this one-way clutch 5 is disposed in such a manner that oil pump 3 (or, the oil pump drive train) cannot rotate in the opposite (or, reverse) direction to a rotation (hereinafter, also called a forward rotation) of motor 4. Hence, one-way clutch 5 corresponds to an oil pump reverse-rotation blocking section (or, means) according to the present invention.

As shown in FIG. 2, one-way clutch 5 is disposed at a drive connecting portion between motor 4 and oil pump 3. At first, in order to explain motor 4 and oil pump 3 and a configuration of a drive connection between motor 4 and oil pump 3 with reference to FIG. 2, these motor 4 and oil pump 3 are disposed (or, configured) inside a common case 6.

Oil pump 3 includes an inner rotor 3b connected to a rotation axis 3a thereof, an eccentric cam ring 3c which is surrounding inner rotor 3b, and a plurality of vanes 3d which are so installed (or, disposed) on an external perimeter surface of inner rotor 3b as to be capable of moving in a radius direction. Operation of oil pump 3 will now be explained. A plurality of vanes 3d which rotate together with inner rotor 3b slide in contact with an internal perimeter surface of eccentric cam ring 3c. While sliding in such a way, a pump chamber formed between adjacent vanes 3d is caused to vary in volume. Thereby, a predetermined pump operation is performed.

Motor 4 includes a motor axis 4a which is so disposed as to be coaxial with oil pump rotation axis 3a, a rotor 4b fixed to motor axis 4a, and a stator 4c which is so disposed as to be surrounding rotor 4b and is fixed to an internal perimeter surface of case 6. One end of motor axis 4a is fitted with oil pump rotation axis 3a by a serration fitting, and thereby is drivingly connected to oil pump rotation axis 3a. Another end of motor axis 4a is supported by case 6 via a bearing 7, another end of motor axis 4a being allowed to rotate free. Motor 4 drivingly rotates rotor 4b in a constant direction by energizing stator 4c. Then, motor 4 outputs this rotation in the constant direction (the forward rotation) from motor axis 4a to oil pump rotation axis 3a. Hence, motor 4 can drive oil pump 3 so as to perform the pump operation.

One-way clutch 5 is interposed (or, intervened) between case 6 and a mutual connecting portion between motor axis 4a and oil pump rotation axis 3a. One-way clutch 5 supports the mutual connecting portion in a radius direction against case 6. Hence, one-way clutch 5 is disposed in such a way that oil pump rotation axis 3a cannot rotate in the opposite (or, reverse) direction to the forward rotation of motor 4.

A detail drawing of one-way clutch 5 is not shown herein. However, one-way clutch 5 is a known device constituted by a cylindrical outer lathe that has wedge-shaped grooves on an internal perimeter surface thereof, a cylindrical inner lathe, a roller that is inserted, in a movable fashion, between the wedge-shaped grooves of the outer lathe and an external perimeter surface of the inner lathe, and a spring that gives an elastic force to the roller resisting a force in the opposite (or, reverse) direction to the rotation of motor 4. The outer lathe of one-way clutch 5 is fixed to case 6, and the inner lathe of one-way clutch 5 is connected to rotation axis 3a of oil pump 3. In addition, a configuration of one-way clutch 5 is not limited to the above-described configuration. The configuration of one-way clutch 5 can be changed as appropriate.

In the stopping apparatus for an oil pump, which is configured as described above in this embodiment, oil pump 3 is drivingly deactivated (or, an actuation of oil pump 3 is stopped) by turning motor 4 off immediately when the hydraulic actuator constituted by controlling valve 2 and transmission mechanism 1 is deactivated (i.e., an ignition switch off). At this time, a remaining pressure still remains within controlling valve 2 and transmission mechanism 1. Due to this remaining pressure, the oil flows from controlling valve 2 and transmission mechanism 1 to oil pump 3 in the reverse direction. So, this remaining pressure acts on oil pump 3.

Ordinarily, such a backflow causes a problem that the backflow causes oil pump 3 to rotate backward and generate a noise (or, an abnormal sound), since motor 4 is not equipped with a backward-rotation preventing function. In this embodiment, one-way clutch 5 mechanically prevents the backward-rotation of oil pump 3, resisting the above-described remaining pressure. Hence, oil pump 3 cannot rotate backward even if the oil flows from controlling valve 2 or transmission mechanism 1 toward oil pump 3 in the reverse direction. Therefore, the problem related to the abnormal sound of the oil pump due to the backward rotation can be resolved.

Moreover, such advantages can be achieved without a valve, for example, the above-described nonreturn valve. Hence, this problem can be resolved without the inconvenience related to the hydraulic loss on the hydraulic circuit and the inconvenience that the space for installing a valve needs to be allocated in the hydraulic circuit even if the space is difficult to be allocated.

Figure 3:
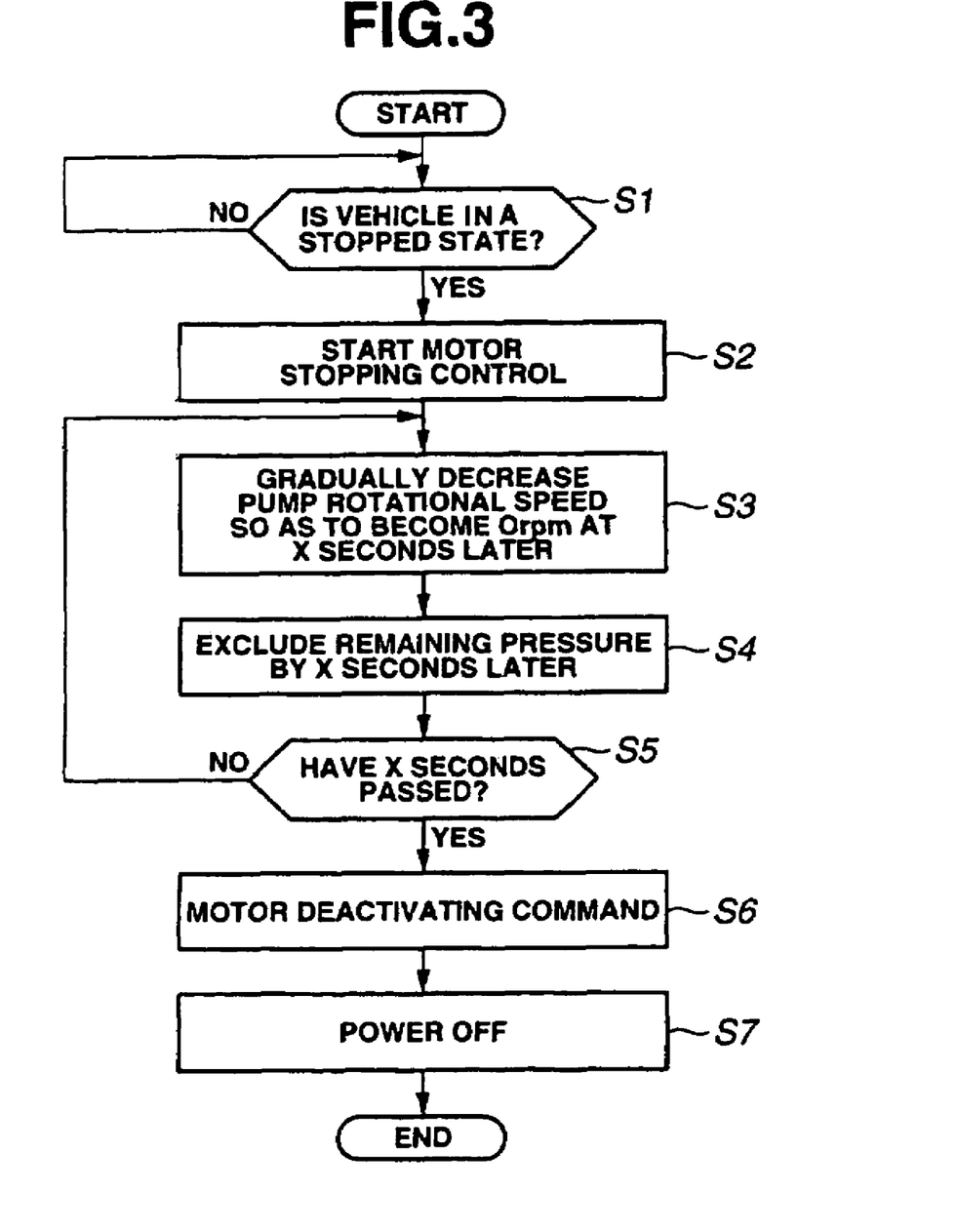
FIG. 3 is an operational flowchart representing a processing of an oil pump stopping control executed in a second preferred embodiment of the stopping apparatus for an oil pump according to the present invention.

FIG. 3 shows a second preferred embodiment according to the present invention. In the second embodiment, the same advantages as described above are achieved by means of a drive control by motor 4 instead of one-way clutch 5 installed in the first embodiment. At first, a controller of the stopping apparatus in this second embodiment determines whether a vehicle is in a stopped state (i.e., the ignition switch is oft) or not, at a step Si. If the ignition switch is "on" and the vehicle is not in the stopped state, the hydraulic actuator constituted by controlling valve 2 and transmission mechanism 1 should not be deactivated (or, an operation of the hydraulic actuator should not be stopped). Since a control according to the present invention is not necessary, the controller initializes the control and waits till the vehicle goes into the stopped state by turning the ignition switch off.

At step S1, when the controller determines that the vehicle goes into the stopped state by an off status of the ignition switch (i.e., an instantaneous time t1 shown in FIG. 4), the controller starts the stopping control of motor 4 at a step S2 and gradually decreases a rotation of oil pump 3 as follows. Namely, at a step S3, the controller decreases the rotation of motor 4 by means of a torque control in such a manner that a rotational speed of oil pump 3 is gradually decreased toward 0, taking X seconds (a predetermined time, for example, several seconds) (or, for a lapse of X seconds) shown after instantaneous time t1 in FIG. 4. In other words, the controller continues to decrease the rotation of motor 4 for a lapse of X seconds (the predetermined time) from a time point at which the controller determines that the vehicle goes into (or, is in) the stopped state (or, at which the hydraulic actuator is deactivated). Hence, step S3 corresponds to a motor rotation gradually decreasing section (or, means) according to the present invention.

Figure 7:
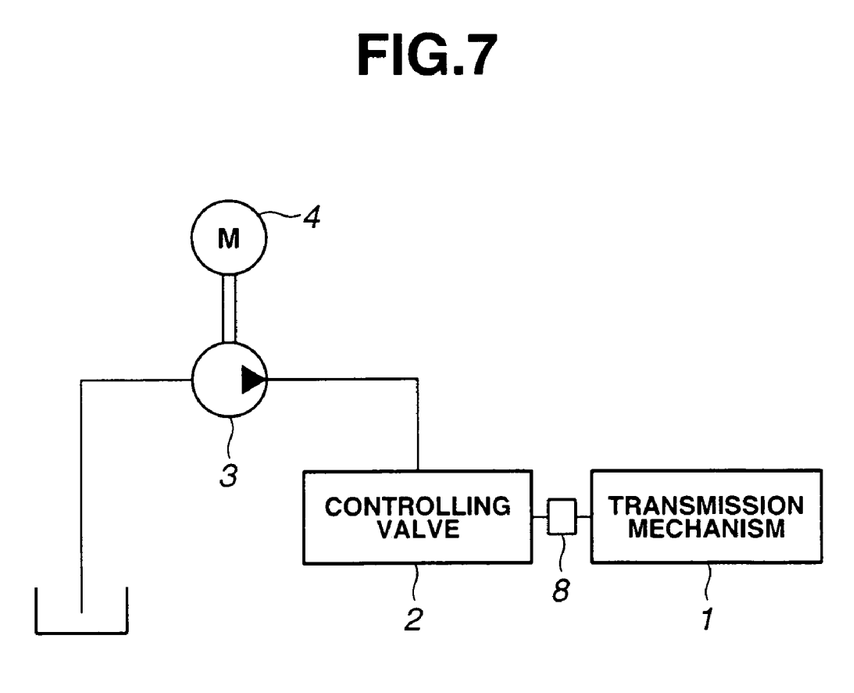
FIG. 7 is a schematic diagram representing a shift control hydraulic circuit for an automatic transmission, to which a stopping apparatus for an oil pump in the second and third embodiments according to the present invention is applied.

At the same time, the controller eliminates (or, excludes) the remaining pressure (which is acting on oil pump 3 and remains) inside the hydraulic actuator constituted by controlling valve 2 and transmission mechanism 1 before X seconds (the predetermined time) have passed (or, elapsed), at a step S4. Hence, step S4 corresponds to a remaining pressure eliminating section (or, means) according to the present invention. In addition, the elimination of the remaining pressure, which is performed by means of a natural (or, spontaneous) leakage from (i.e., caused by) the hydraulic actuator constituted by controlling valve 2 and transmission mechanism 1, is advantageous in cost. However, according to the required time for eliminating the remaining pressure, the elimination of the remaining pressure may be performed in such a configuration that the remaining pressure is forced to be eliminated (or, excluded) by opening an elimination valve 8 disposed for eliminating the remaining pressure, as shown in FIG. 7.

Figure 4:
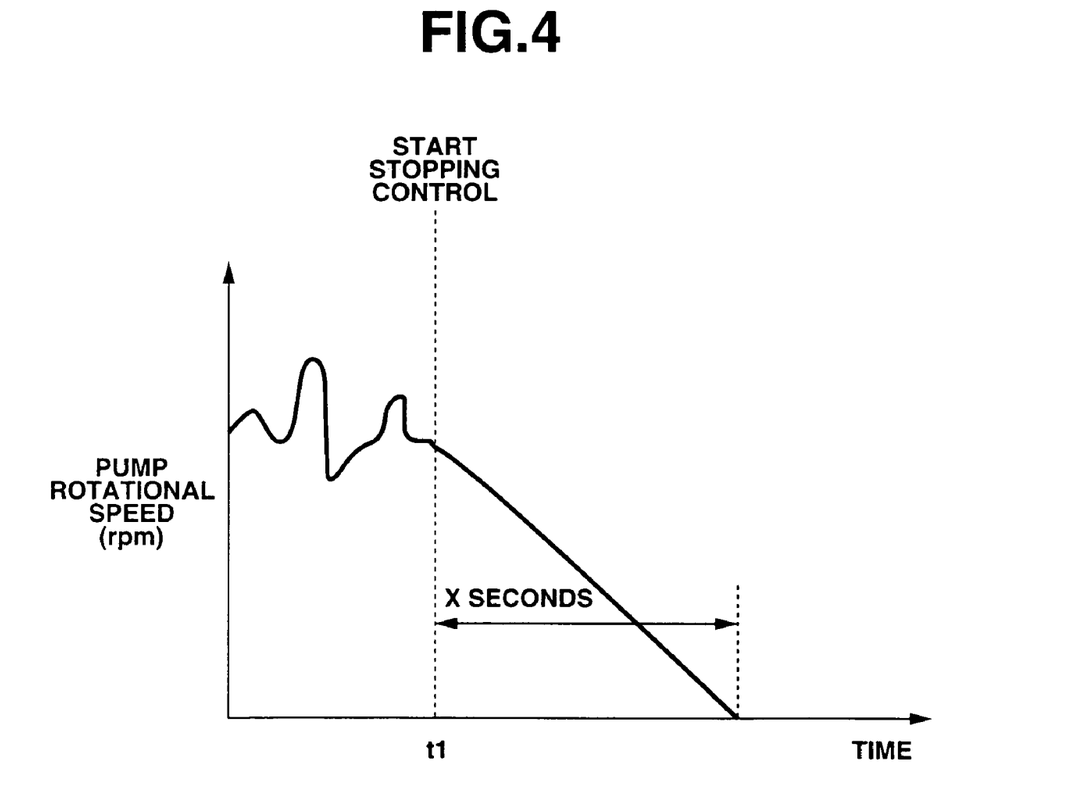
FIG. 4 is an operational timing chart of the oil pump stopping control executed in the second embodiment.

At a next step S5, the controller determines whether the above-described predetermined time (X seconds) has passed from instantaneous time t1 (at which the oil pump stopping control is started) shown in FIG. 4. Then, the controller continues to carry out the above-described processing of step S3 and step S4 until a lapse of the X seconds. Namely, the controller gradually decreases the rotational speed of oil pump 3 so as to become 0 when the X seconds has just elapsed, by decreasing the rotation of motor 4 using the torque control. And the controller completes the elimination of the remaining pressure within the hydraulic actuator by a lapse of X seconds. In addition, the predetermined time (X seconds) is, for example, several seconds or several tenths of a second. The predetermined time (X seconds) is predetermined according to specifications of the hydraulic actuator, motor 4, oil pump 3 and other drive train. Hence, the predetermined time (X seconds) can be optimized as appropriate by experiment.

When the controller determines that X seconds has elapsed at a step 5, the controller deactivates motor 4 at a step 6 and makes the rotational speed of oil pump 3 to be 0 as shown in FIG. 4. Next, at a step S7, the controller turns off a power in response to the off status of the ignition switch and finishes the control.

In such a configuration of this embodiment, the rotation of motor 4 (or, oil pump 3) is completely stopped after the remaining pressure within the hydraulic actuator constituted by controlling valve 2 and transmission mechanism 1 is eliminated. Hence, the oil's backflow toward oil pump 3 due to the remaining pressure can be avoided (or, prevented). Thereby, the backward rotation of oil pump 3 can be avoided. Therefore, the problem related to the abnormal sound due to this backward rotation can be resolved. Furthermore, the problem is resolved in such a way that the oil's backflow toward oil pump 3 is prevented by means of a software-based treatment of the rotation decreasing control through the torque control of motor 4 without a component such as the above-described nonreturn valve or one-way clutch 5 shown in FIG. 1 and FIG. 2. Hence, a cost cutting and an improvement in durability, reliability and performance can be achieved. Also, the space for disposing such a component can become unnecessary.

Figure 5:
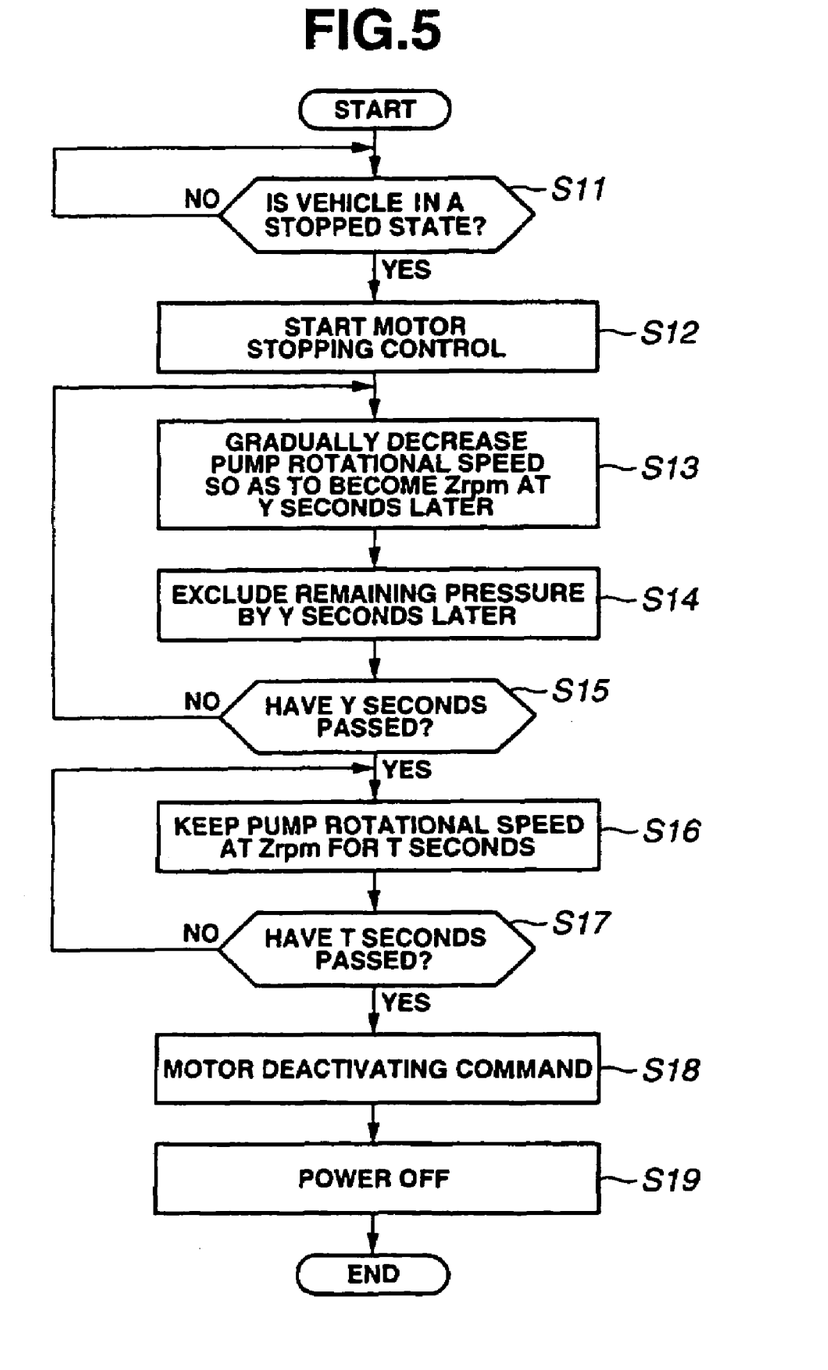
FIG. 5 is an operational flowchart representing a processing of an oil pump stopping control executed in a third preferred embodiment of the stopping apparatus for an oil pump according to the present invention.

FIG. 5 shows a third preferred embodiment according to the present invention. In the third embodiment, the same advantages as described above are achieved by preventing the oil's backflow toward oil pump 3 due to the remaining pressure by means of the drive control of motor 4 as described in the second embodiment in FIG. 3. In this third embodiment, at a step S11 and a step S12, a controller of the stopping apparatus in the third embodiment carries out the same processing as at step S1 and S2 in FIG. 3.

When the controller determines that the vehicle goes into the stopped state by the off status of the ignition switch at step S11 (i.e., an instantaneous time t1 shown in FIG. 6), the controller starts the stopping control of motor 4 at step S12 and gradually decreases the rotation of oil pump 3 as follows. Namely, at a step S13, the controller decreases the rotation of motor 4 by means of the torque control in such a manner that the rotational speed of oil pump 3 is gradually decreased toward a set rotational speed (Z rpm (revolutions per minute), for example, several tens of rpm), taking Y seconds (a first predetermined time, for example, several seconds) shown after instantaneous time t1 in FIG. 6. In other words, the controller continues to decrease the rotation of motor 4 for a lapse of Y seconds from a time point at which the controller determines that the vehicle goes into (or, is in) the stopped state. Hence, step S13 corresponds to the motor rotation gradually decreasing section (or, means) according to the present invention.

At the same time, the controller eliminates (or, excludes) the remaining pressure (which is acting on oil pump 3 and remains) inside the hydraulic actuator constituted by controlling valve 2 and transmission mechanism 1 before the predetermined time (Y seconds) has elapsed, at a step S14. Hence, step S14 corresponds to the remaining pressure eliminating section (or, means) according to the present invention. In addition, the elimination of the remaining pressure, which is performed by means of the natural (or, spontaneous) leakage from the hydraulic actuator constituted by controlling valve 2 and transmission mechanism 1, is advantageous in cost. However, according to the required time for eliminating the remaining pressure, the elimination of the remaining pressure may be performed in such a configuration that the remaining pressure is forced to be eliminated (or, is forcefully eliminated) by opening elimination valve 8 disposed for eliminating the remaining pressure as shown in FIG. 7.

Figure 6:
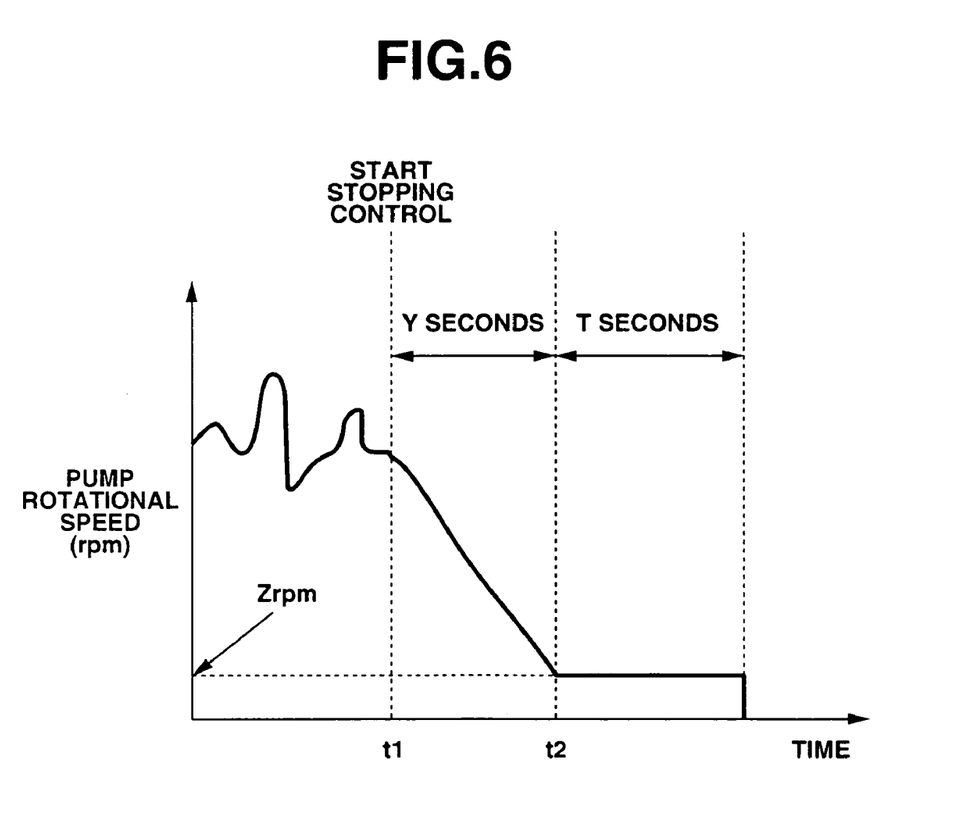
FIG. 6 is an operational timing chart of the oil pump stopping control executed in the third embodiment.

At a next step S15, the controller determines whether the above-described Y seconds have passed from instantaneous time t1 (at which the oil pump stopping control is started) shown in FIG. 6. Then, the controller continues to carry out the above-described processing of step S13 and step S14 until a lapse of Y seconds (the predetermined time). Namely, the controller gradually decreases the rotational speed of oil pump 3 so as to become the set rotational speed (Z rpm) when Y seconds have just elapsed, by decreasing the rotation of motor 4 using the torque control. And the controller completes the elimination of the remaining pressure within the hydraulic actuator constituted by controlling valve 2 and transmission mechanism 1, by a lapse of Y seconds.

When, the controller determines that the above-described predetermined time (Y seconds) has passed at step S15, the controller carries out the torque control for motor 4 in such a manner that the rotational speed of oil pump 3 is kept at the set rotational speed (Z rpm) for a lapse of T seconds (a second predetermined time, for example, several seconds) shown after instantaneous time t2 in FIG. 6, at a step 16. Hence, step S16 and step S13 correspond to the motor rotation gradually decreasing section (or, means) according to the present invention.

At a next step S17, the controller determines whether T seconds have passed from instantaneous time t2 in FIG. 6. Then, the controller continues to carry out the above-described processing of step S16 and, thereby, keep the rotational speed of oil pump 3 at the set rotational speed (Z rpm) until a lapse of T seconds. When the controller determines that T seconds have passed at step S17, the controller deactivates motor 4 at a step S18 and sets the rotational speed of oil pump 3 to 0 rpm as shown in FIG. 6. At a next step S19, the controller turns off the power in response to the off status of the ignition switch and finishes the control.

In such a configuration of this embodiment, the remaining pressure within the hydraulic actuator constituted by controlling valve 2 and transmission mechanism 1 is eliminated before the rotation of motor 4 (or, oil pump 3) is decreased to the set rotational speed (Z rpm). Hence, the oil's backflow toward oil pump 3 due to the remaining pressure can be avoided. Thereby, the backward rotation of oil pump 3 can be avoided. Therefore, the problem related to the abnormal sound due to this backward rotation can be resolved.

Furthermore, the problem is resolved in such a way that the oil's backflow toward oil pump 3 is prevented by means of a software-based treatment of the rotation decreasing control through the torque control of motor 4 without a component such as the above-described nonreturn valve or one-way clutch 5 shown in FIG. 1 and FIG. 2. Hence, a cost cutting and an improvement in durability, reliability and performance can be achieved. Also, the space for disposing such a component can become unnecessary.

In this embodiment, at first, the remaining pressure within the hydraulic actuator constituted by controlling valve 2 and transmission mechanism 1 is eliminated before the rotation of motor 4 (or, oil pump 3) becomes the set rotational speed (Z rpm). Afterwards, the rotational speed of motor 4 (or, oil pump 3) is set to 0 rpm when T seconds (the second predetermined time) have just elapsed. Hence, a timing at which the elimination of the remaining pressure is completed is not needed to conform to a timing at which the rotational speed of motor 4 (or, oil pump 3) becomes 0 rpm. Therefore, a rotational speed control of the motor can be more easily performed than the case that the rotational speed of motor 4 (or, oil pump 3) is set to 0 rpm after a lapse of the predetermined time (X seconds) as described in the second embodiment. In addition, the first predetermined time (Y seconds) described above for purposes of explanation is, for example, several seconds or several tenths of a second. Also, the above-described second predetermined time (T seconds) is, for example, several seconds or several tenths of a second. The set rotational speed (Z rpm), the first predetermined time (Y seconds) and the second predetermined time (T seconds) are predetermined according to specifications of the hydraulic actuator, motor 4, oil pump 3 and other drive train components. Hence, the set rotational speed (Z rpm), the first predetermined time (Y seconds) and the second predetermined time (T seconds) can be optimized as appropriate by experiment.

This application is based on a prior Japanese Patent Application No. 2004-044133 filed on Feb. 20, 2004. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A stopping apparatus for an oil pump, the stopping apparatus being applied to a hydraulic actuator, the hydraulic actuator working on the basis of a hydraulic pressure derived from the oil pump driven by a motor, the stopping apparatus being capable of controllably deactivating the oil pump after the hydraulic actuator is deactivated, the stopping apparatus comprising:

an oil pump backward rotation preventing section that prevents a backward rotation of the oil pump, which is caused by a backward oil flow from the hydraulic actuator to the oil pump, by resisting a pressure remaining within the hydraulic actuator, the remaining pressure acting on the oil pump, when deactivating the oil pump after the hydraulic actuator is deactivated.

2. A stopping apparatus for an oil pump as claimed in claim 1, wherein the oil pump backward rotation preventing section is a one-way clutch that mechanically prevents the backward rotation of the oil pump.

3. A stopping apparatus for an oil pump as claimed in claim 1, wherein the oil pump backward rotation preventing section comprises:

a motor rotation gradually decreasing section that controls a rotation of the motor to gradually decrease toward 0 for the entire lapse of a predetermined time from a time point at which the hydraulic actuator is deactivated; and a remaining pressure eliminating section that eliminates the remaining pressure while the motor rotation gradually decreasing section is decreasing the rotation of the motor toward 0.

4. A stopping apparatus for an oil pump as claimed in claim 3, wherein the motor rotation gradually decreasing section controls the motor so as to force the rotation of the motor to become equal to 0 when the predetermined time has just elapsed.

5. A stopping apparatus for an oil pump as claimed in claim 3, wherein the remaining pressure eliminating section completes the elimination of the remaining pressure before the predetermined time has elapsed.

6. A stopping apparatus for an oil pump as claimed in claim 4, wherein the remaining pressure eliminating section completes the elimination of the remaining pressure before the predetermined time has elapsed.

7. A stopping apparatus for an oil pump as claimed in claim 1, wherein the oil pump backward rotation preventing section comprises:

a motor rotation gradually decreasing section that decreases a rotation of the motor toward a set rotational speed for a lapse of a first predetermined time from a time point at which the hydraulic actuator is deactivated, that keeps the rotation of the motor at the set rotational speed for a lapse of a second predetermined time from a time point at which the first predetermined time has just elapsed, and that sets the rotation of the motor to 0 when the second predetermined time has just elapsed; and a remaining pressure eliminating section that eliminates the remaining pressure while the motor rotation gradually decreasing section is decreasing the rotation of the motor toward the set rotational speed.

8. A stopping apparatus for an oil pump as claimed in claim 7, wherein the motor rotation gradually decreasing section gradually decreases the rotation of the motor in such a manner that the rotation of the motor becomes the set rotational speed when the first predetermined time has just elapsed.

9. A stopping apparatus for an oil pump as claimed in claim 7, wherein the remaining pressure eliminating section completes the elimination of the remaining pressure before the second predetermined time has elapsed.

10. A stopping apparatus for an oil pump as claimed in claim 8, wherein the remaining pressure eliminating section completes the elimination of the remaining pressure before the first predetermined time has elapsed.

11. A stopping apparatus for an oil pump as claimed in claim 3, wherein the remaining pressure eliminating section performs the elimination of the remaining pressure by a natural leakage caused by the hydraulic actuator.

12. A stopping apparatus for an oil pump as claimed in claim 3, wherein the remaining pressure eliminating section includes an elimination valve to eliminate the remaining pressure, the remaining pressure eliminating section forcefully eliminating the remaining pressure by opening the elimination valve.

13. A stopping apparatus for an oil pump as claimed in claim 7, wherein the remaining pressure eliminating section performs the elimination of the remaining pressure by a natural leakage caused by the hydraulic actuator.

14. A stopping apparatus for an oil pump as claimed in claim 7, wherein the remaining pressure eliminating section includes an elimination valve to eliminate the remaining pressure, the remaining pressure eliminating section forcefully eliminating the remaining pressure by opening the elimination valve.

15. A stopping apparatus for an oil pump as claimed in claim 2, wherein the one-way clutch is installed on an oil pump drive train between the motor and the oil pump.

16. A stopping method for an oil pump, the stopping method being applied to a hydraulic actuator, the hydraulic actuator working on the basis of a hydraulic pressure derived from the oil pump driven by a motor, the stopping method comprising:

controlling to decrease a rotation of the motor gradually toward 0 for the entire lapse of a predetermined time from a time point at which the hydraulic actuator is deactivated; and eliminating a remaining pressure within the hydraulic actuator while decreasing the rotation of the motor.

17. A stopping method for an oil pump, the stopping method being applied to a hydraulic actuator, the hydraulic actuator working on the basis of a hydraulic pressure derived from the oil pump driven by a motor, the stopping method comprising:

controlling to decrease a rotation of the motor gradually toward a set rotational speed for a lapse of a first predetermined time from a time point at which the hydraulic actuator is deactivated;

eliminating a remaining pressure within the hydraulic actuator while decreasing the rotation of the motor toward the set rotational speed;

controlling to keep the rotation of the motor at the set rotational speed for a lapse of a second predetermined time from a time point at which the first predetermined time has just elapsed; and controlling to set the rotation of the motor to equal to 0 when the second predetermined time has just elapsed.

18. A stopping apparatus for an oil pump, the stopping apparatus being applied to a hydraulic actuator working based on a hydraulic pressure derived from the oil pump driven by a motor, the stopping apparatus comprising:

an oil pump backward rotation preventing section configured to resist pressure remaining within the hydraulic actuator and acting on the oil pump after the hydraulic actuator is deactivated, the oil pump backward rotation preventing section including:

a motor rotation gradually decreasing section that controllably decreases a rotation of the motor gradually toward 0 for a predetermined elapsed time just after the hydraulic actuator is deactivated, so as to prevent a backward rotation of the motor; and a remaining pressure eliminating section that eliminates the remaining pressure while the motor rotation gradually decreasing section is decreasing the rotation of the motor toward 0.

* * * * *